April 15, 1969 C. W. BRANDON 3,438,352
METHOD FOR FORMING AND/OR AUGMENTING AN ENERGY WAVE
Original Filed June 3, 1954
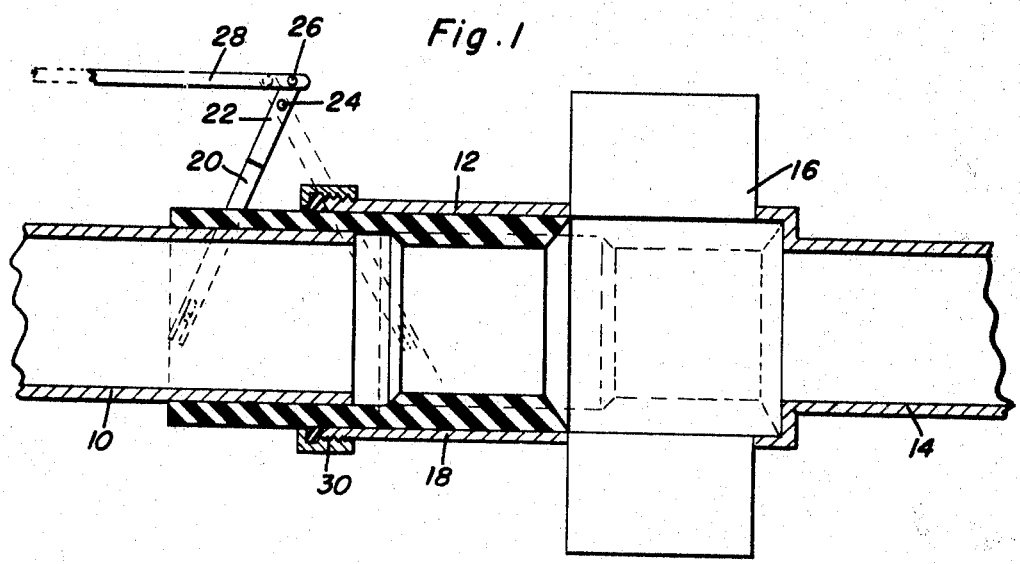
Fig. 1
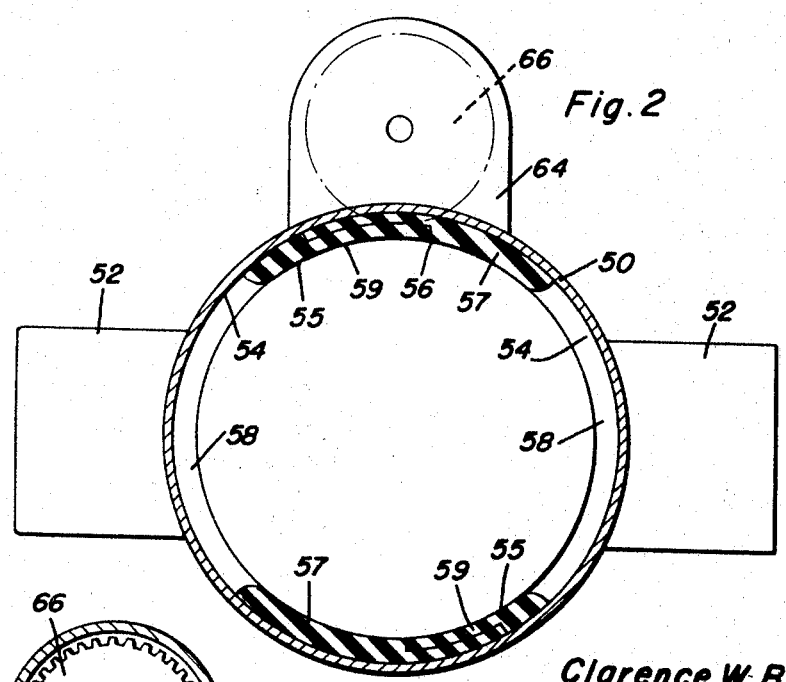
Fig. 2
Fig. 3
Clarence W. Brandon
INVENTOR.
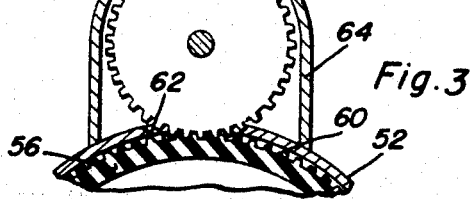

Clarence W. Brandon
INVENTOR.

Clarence W. Brandon
INVENTOR.

BY Head & Johnson
Attorneys

Clarence W. Brandon
INVENTOR.

Clarence W. Brandon
INVENTOR.

BY *Clarence A. O'Brien*
*and Harvey B. Jacobson*
Attorneys

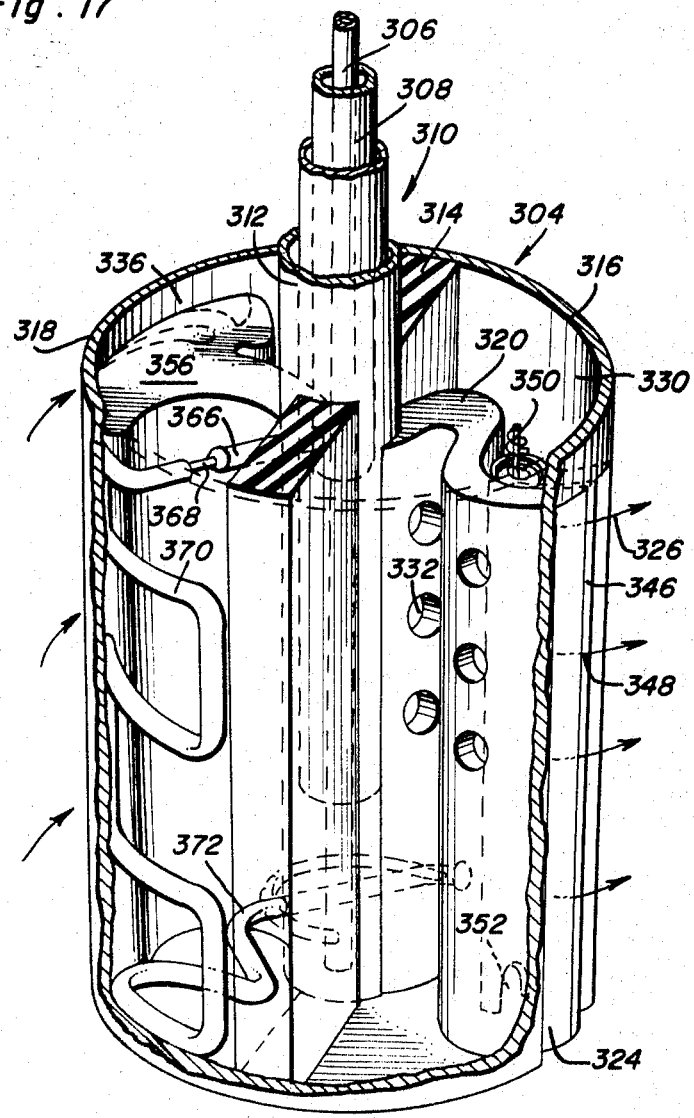

Clarence W. Brandon
INVENTOR.

Clarence W. Brandon
INVENTOR.

United States Patent Office 3,438,352
Patented Apr. 15, 1969

3,438,352
METHOD FOR FORMING AND/OR AUGMENTING AN ENERGY WAVE
Clarence W. Brandon, Tallahassee, Fla., assignor of twelve and one-half percent to Orpha B. Brandon, Tallahassee, Fla., and fifty percent to Nat A. Hardin, Catherine H. Newton, and Hazel H. Wright, all of Forsyth, Ga.
Original application June 3, 1954, Ser. No. 434,299, now Patent No. 3,042,115, dated July 3, 1962. Divided and this application June 29, 1962, Ser. No. 206.207
Int. Cl. G10k 10/00, 11/00; E21b 43/25
U.S. Cl. 116—137                                          41 Claims

ABSTRACT OF THE DISCLOSURE

The level of energy transmitted through a transmitting medium is controllably varied by intermittent transfer of heat to or from the energy transmitting medium at a controllable frequency or interruption rate. The heat energy is furthermore transferred in a predetermined phase relation to the energy transmitted through the medium.

---

This invention pertains to apparatuses for forming and/or augmenting an energy wave and more specifically has reference to processes and apparatuses whereby heat is periodically applied from a heat source to a fluid medium for initiating, increasing or maintaining the energy content of an energy-carrying wave in said medium, or alternatively, withdrawing energy from such wave.

This invention is a division of co-pending application S.N. 434,299, filed June 3, 1954, now U.S. Patent 3,042,-115, and is similar and related to the subject matter set forth in co-pending applications S.N. 431,246, now U.S. Patent No. 3,131,591, filed May 20, 1954; S.N. 833,122 now U.S. Patent 3,141,099, filed Aug. 3, 1959, as a continuation of S.N. 431,388, filed May 21, 1954, now abandoned; and co-pending application S.N. 665,995 now U.S. Patent 3,302,720, filed June 17, 1957.

It is axiomatic, as stated by generally recognized authorities in the study of the wave transmission of energy in a wave propagating medium, that heat applied to an energy carrying wave therein, during the compression phase thereof or abstracted during the rarefaction phase thereof, will increase the energy content of the wave by that amount; while the application of heat during the rarefaction phase or its subtraction during the compression phase will decrease the wave energy content to that extent. Further, if heat is applied to the medium at the proper phase angle, before and/or after the peak of the compression phase of the wave, the frequency of the energy carrying wave may be altered correspondingly. The present invention is concerned with and based upon this fundamental principle of wave mechanics, and utilizes the application of heat, periodically and in different manners, to wave mediums for these purposes.

The basic and fundamental purpose and aim of the present invention is to provide various means whereby heat from either a source having a continuous and/or uniform emission of heat therefrom, or from a source which periodically produces and/or emits heat, may be periodically and intermittently applied to a wave propagating medium to thereby initiate an energy carrying wave therein; maintain or modify the energy content of an energy transmitting wave therein; vary the frequency of an energy wave; apply sensible heat to the medium; or otherwise modify and control the characteristics of energy transmitting waves therein.

A very important purpose and object of this invention is to provide means whereby the foregoing objects may be applied and effected in the general field of the wave transmission of energy; and which shall also be particularly applicable to and available for use in the treating of and the recovery of gases and oils from petroliferous formations.

A further important object of this invention is to provide means whereby an energy carrying wave in a wave propagating medium may be initiated solely by the periodic application of heat impulses to the medium, with the heat being obtainable from either constant emission or periodically emitting heat sources.

A further important object of the invention is to provide apparatuses and processes for treating oil bearing formations to facilitate the secondary recovery of oils and gases therefrom by the application of pulsating pressures upon a liquid drive medium for pressurizing the formation accompanied by the introduction of heat and/or gases into the pressurizing medium for application to the formation.

Another important object of the invention is to provide apparatuses in conformity with the preceding objects wherein the application of heat may be such as to initiate an energy transmitting wave in a pressurizing medium; and/or to add energy to and thereby increase the energy content of an energy transmitting wave.

A further and more specific object of the invention is to provide apparatuses and processes whereby heat may be periodically introduced into and withdrawn from a pressurizing medium and/or an oil bearing formation for producing or increasing the energy content of an energy transmitting wave.

FIGURES 1–14 relate to various sub-combinations of the general organization of FIGURES 15–21 which are capable of use separately and independently of each other and of the general organization. It is believed that an explanation of the functioning of the embodiments of FIGURES 1–14 will facilitate an understanding of the more complex and comprehensive organization of FIGURES 15–21.

These and other objects and advantages of this invention will become more apparent with reference to the details of construction and operation as more fully hereinafter described and claimed, reference being had to the accompanying drawings forming a part hereof, wherein like numerals refer to like parts throughout, and in which:

FIGURE 1 is a diagrammatic view, partly in elevation, partly in section and with certain parts shown in alternative position in full and dotted lines therein, of a device whereby sensible heat or sensible cold from any suitable continuous or intermittent source of heat or cold may be periodically introduced into a wave propagating medium, as in a conduit, at controlled and periodically timed intervals in order to initiate and/or maintain an energy carrying wave in such medium, the control timer for the introduction of heat or cold being of a reciprocating nature.

FIGURE 2 is a diagrammatic view in vertical transverse section through a portion of a conduit and showing a mechanism whereby heat energy or absence of heat energy from either a continuous or intermittent source of heat or cold may be periodically applied to a wave propagating medium for initiating and/or maintaining an energy carrying wave therein, this arrangement showing a rotary or oscillating control interrupter for timing the introduction of heat energy as into or from a fluid medium.

FIGURE 3 is an enlarged detail view showing the manner in which a rotary or oscillatory control interrupter is operated.

Figure 13:
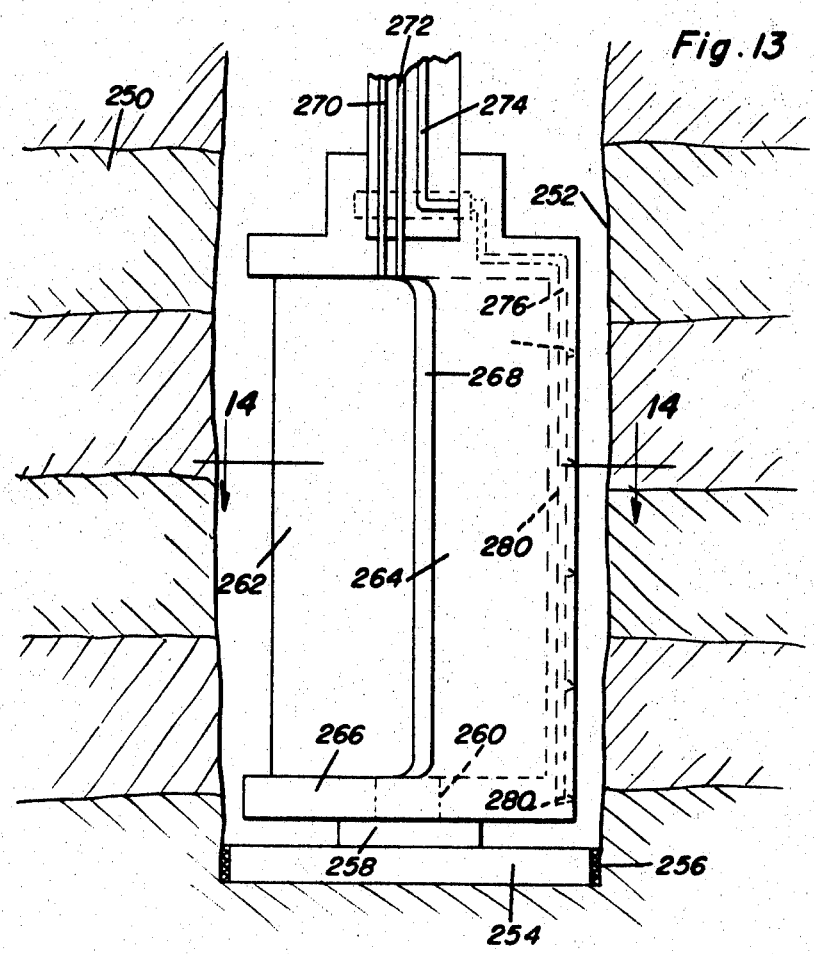

FIGURE 13 is a diagrammatic view in vertical section of a portion of an oil-bearing formation and showing another form by which heat energy from a constant source of heat is intermittently applied to the formation for initiating, augmenting or maintaining an energy-transmitting wave therein and wherein the pressure of a pressurizing liquid drive upon the formation may be also utilized to operate the timing control interrupter of the heat applying device.

Figure 14:
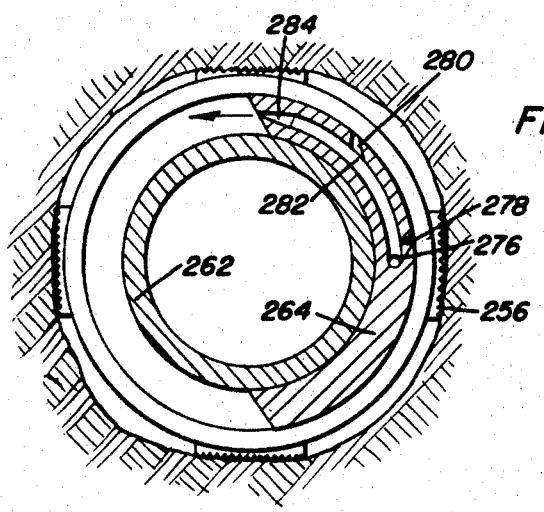

FIGURE 14 is a horizontal sectional detail view of the arrangement of FIGURE 13, taken substantially upon the plane indicated by the section line 14—14 thereof.

Figure 16:
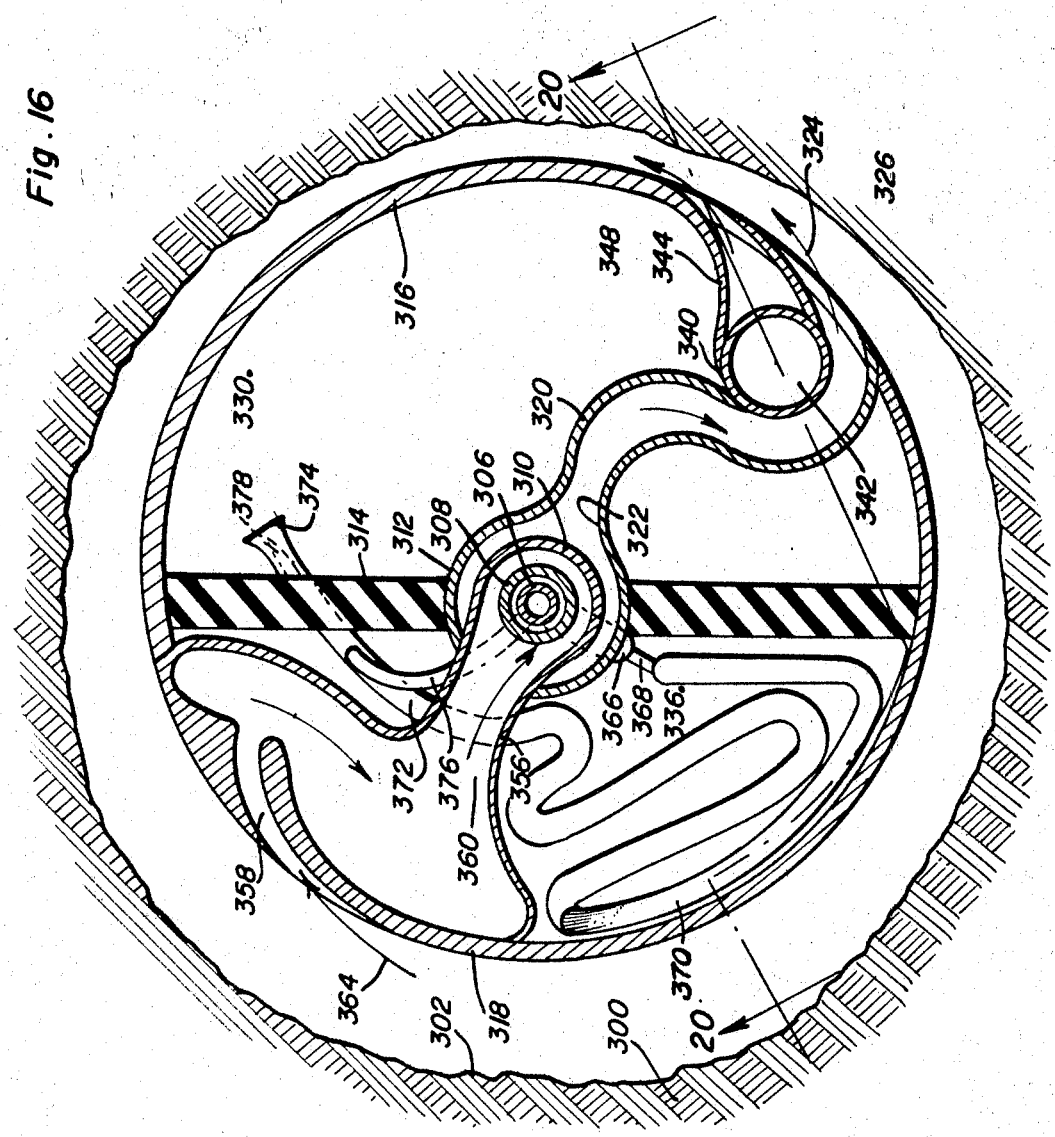
Figure 15:
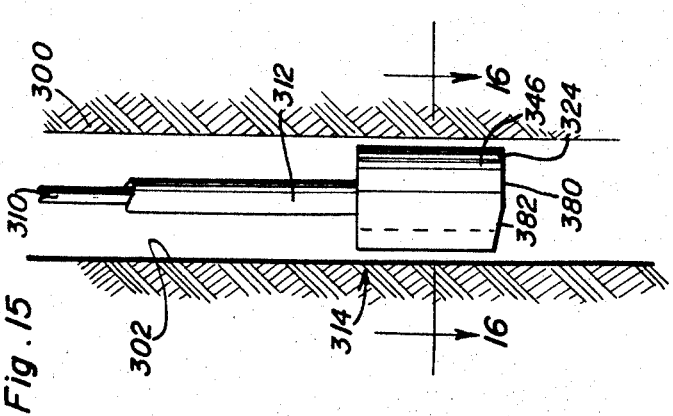
Figure 18:
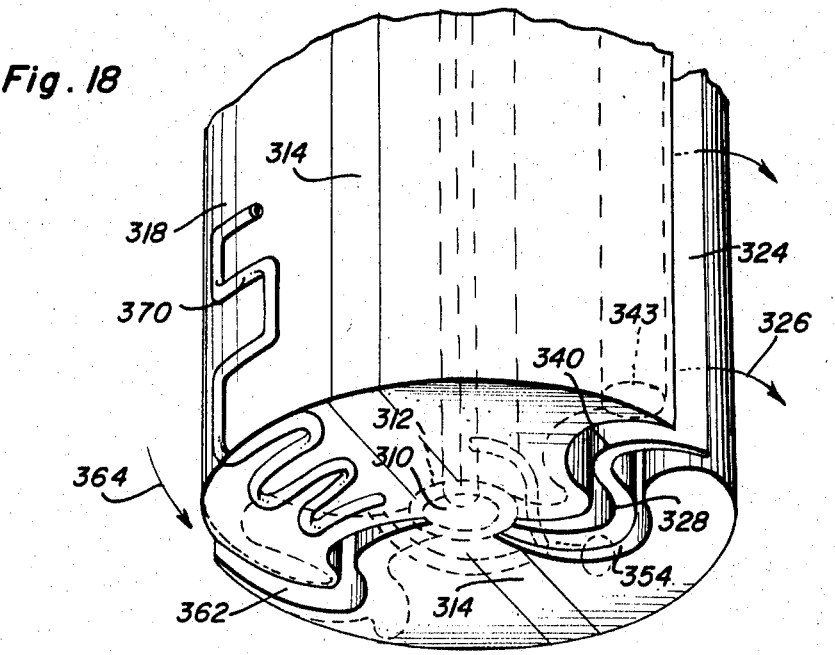
Figure 21:
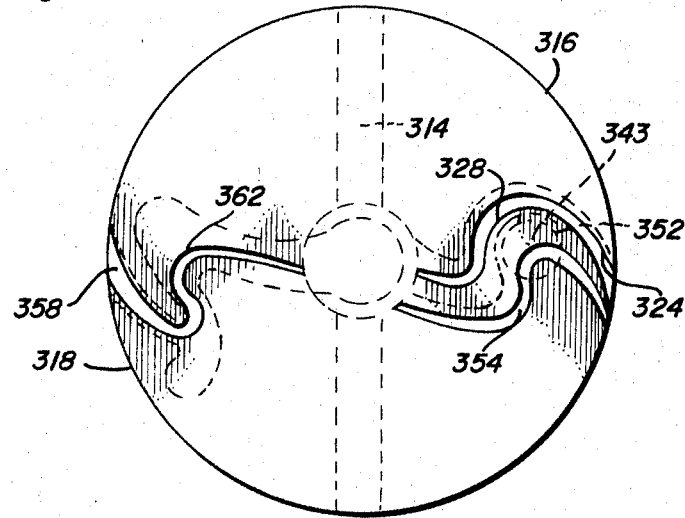
Figure 19:
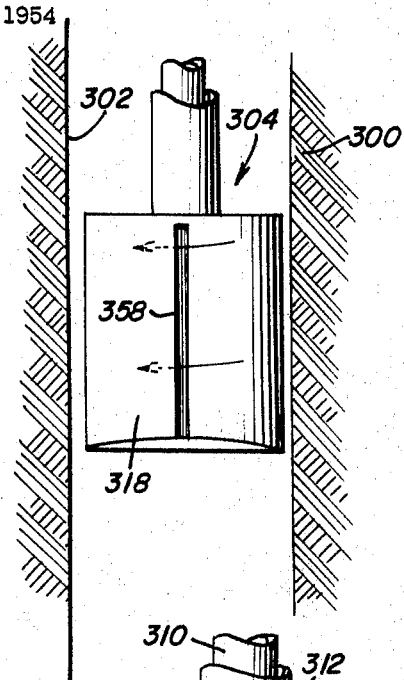
Figure 20:
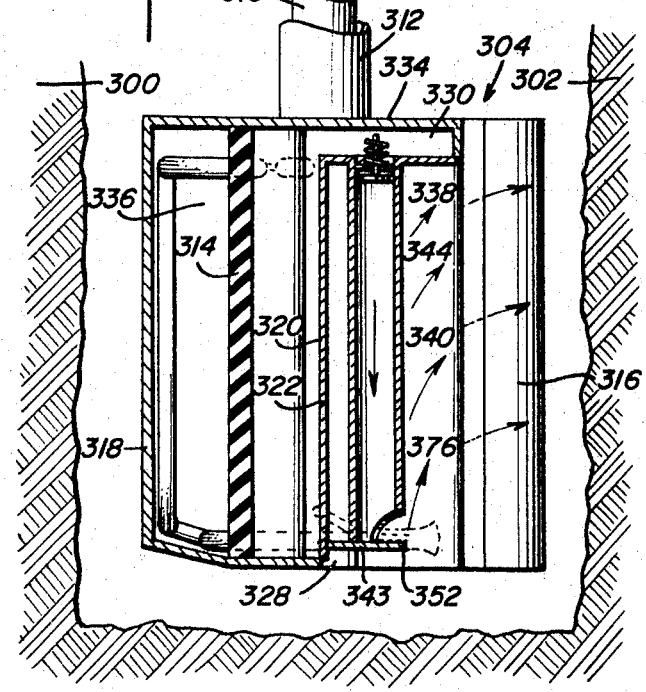

FIGURE 15 is a diagrammatic view in vertical section through a portion of an oil-bearing formation having a well bore therein and showing the preferred embodiment of apparatus in accordance with this invention applied thereto;

FIGURE 16 is a horizontal sectional view taken upon an enlarged scale substantially upon the plane indicated by the section line 16–16 of FIGURE 15 and showing certain internal structural details of the apparatus;

FIGURE 17 is a phantom perspective view of the apparatus of FIGURES 15 and 16, certain parts being broken away and certain parts being omitted therefrom in order to simplify the showing;

FIGURE 18 is a perspective view of the bottom portion of the apparatus shown in FIGURE 17;

FIGURE 19 is a view similar to FIGURE 15 but showing in elevation the opposite side of the apparatus;

FIGURE 20 is a vertical sectional view taken substantially upon the plane indicated by the broken section line 20—20 of FIGURE 16 and showing certain details of the internal construction of the apparatus; and FIGURE 21 is a bottom plan view of the apparatus.

Generally speaking, this invention includes the use of heat or refrigeration intermittently or periodically directly applied to a fluid medium for the purpose of heating or refrigerating the same and/or producing, maintaining or modifying an energy-transmitting wave therein. An essential characteristic of the forms of the invention disclosed herein is that the heat or refrigeration, regardless of its source or type, is periodically and intermittently applied to the medium.

While the principles of this invention are particularly adapted to the utilization of heat or absence of heat energy from a heat or cold source continuously emitting or abstracting heat at a substantially uniform temperature, they are also applicable to the employment of heat or cold sources having an intermittent or variable emission or subtracting of heat and at other than uniform temperatures.

The preferred manner of practicing this invention is set forth in FIGURES 1–21 inclusive. However, numerous features and portions of the same are capable of being used singly or in various combinations with each other; and in order to facilitate an understanding of the preferred embodiment it is deemed preferable to first describe the structure and operation of the various embodiments of FIGURES 1–21.

FIGURE 1

Referring now specifically to FIGURE 1, there is provided a conduit 10 which is telescopically received in the enlarged end 12 of a second conduit 14. For convenience and simplicity of illustration, the conduit 10 has been shown as telescopically received within the conduit section 12, although it will be readily apparent that the reverse construction could also be employed, since the principle of operation would be the same. Extending through the wall of the enlarged end 12 is a direct or indirect heat exchanger indicated generally by the numeral 16 such as in U.S. Patent 1,925,032. The heat exchanger may consist of a ring or annulus whose internal surface is exposed to the interior of the conduit portion 12. Alternatively, it could consist of a number of separate heating or cooling units, each positioned to have its inner face exposed to the interior of the conduit; or in some instances, if desired, the heat exchanger, whether a single annular member of a plurality of units could be positioned upon and surround the exterior of the conduit portion 12.

The scope of this invention and the successful practicing of the principles of the same are not limited to any particular type of heating or cooling means. However, the various types of heat exchangers disclosed in detail in my co-pending applications are deemed to be especially applicable to the present invention. In particular, it is thought that a source of heat or cold which continuously emits or abstracts heat at a substantially constant temperature is especially suitable for the purpose of this invention. In this connection, for a heat means, atomic heating of any character such as the liberation of heat energy from atomic reaction, concentrated solar heat and the like is especially applicable to this purpose by providing a heat source of exceedingly great intensity and a substantially constant rate of emission.

In order to intermittently apply the heat or refrigeration, whether from a continuous or from an intermittent source, and whether at a contsant rate or at a variable rate of emission or abstraction to or from the interior of the conduit and to or from the wave propagating medium therein, there is provided a sleeve 18 of a refractory material constituting a heat shield, guard, mask or interrupter as set forth hereinafter, and which shall be of a suitable refractory material and such as will constitute an efficient and effective heat insulator. This sleeve is slidably received between the concentric conduits 10 and 12 and may be moved axially of the conduit whereby the sleeve may be selectively interposed between the heat exchanger 16 and the fluid medium within the conduits as indicated in dotted lines in FIGURE 1; or may be withdrawn to unmask the heat exchanger as shown in full lines in FIGURE 1 to permit the introduction of heat into or from the medium.

To effect and control this reciprocation or axial movement of the shield of masking sleeve 18, any suitable control means may be employed, as shown by way of example, using lever 22, attached at one extreme to sleeve 10, and pivoted about shaft 24. The lever 22 is pivoted at 26 at the other of its extremities to the end of a link 28 which may be manipulated in any desired manner to actuate the lever and the heat interrupting sleeve. A packing or stuffing box 30 is provided to establish a seal between the heat insulating shield 18 and the conduit portion 12; and if desired a similar arrangement may be provided between the end of the heat interrupting sleeve and the conduit 10.

Instead of being used as a portion of a conduit the apparatus including the sections 10, 12, 14 may be constructed as a separate unit, which may be lowered and adjustably positioned in a well bore to operatively treat an oil bearing formation. This mode of use is clearly set forth in detail in connection with the embodiment of FIGURES 7, 8 of my co-pending application, Ser. No. 431,246, now Patent 3,133,591, and further description of the same is deemed to be unnecessary herein.

By intermittently moving the sleeve between its full and dotted line positions, the flow of heat to or from the heat exchanger 16 and the fluid medium will be periodically interrupted. When the heat or cold source is of sufficient intensity the layers of molecules of the medium adjacent the heat exchanger will be alternately compressed by violent agitation of the heating and rarefied by interruption of the heat flow, thus producing and initiating the compression and rarefaction phases of an energy wave.

By control of the frequency and rate of movement of the periodic motion of the interrupter sleeve, and/or the intensity or character of the heating or refrigerating means it is evident that the energy wave may be given varied characteristics.

If the fluid medium within the conduits has an energy transmitting wave produced therein in any desired manner, such as set forth in my hereinbefore mentioned co-pending and abandoned applications, this embodiment of the invention, by properly timing and controlling the actuation of the interrupter sleeve and/or the heat or cold sources, will be effective to modify, augment, maintain, vary the frequency or otherwise modify the characteristics of said energy wave. Further, where heat is used, any heat not converted into wave energy is of course available for beneficially heating the medium and/or the formation.

The fluid medium itself may of course be subject to various pressures such as from a water drive, pulsations and the like and these pressures may be augmented or modified by the selective application of heat to or from the fluid medium as set forth therein.

This embodiment with heat use therefore constitutes a means which may be employed to heat, vibrate, fracture, disintegrate or otherwise treat an oil bearing formation to facilitate recovery of oil therefrom, as well as for propelling fluid as in a conduit and/or from a well bore; and whereby the viscosity of the pumped fluid would be lessened in the conduit and/or formation, so that the heaviest components of the fluid would be maintained in the fluid and not deposited in the conduit and formation adjacent the well bore upon reduction of pressure, as occurs with present methods of production and conducting of formation fluids to storage.

FIGURES 2 AND 3

FIGURES 2 and 3 represent an arrangement very similar to FIGURE 1 for intermittently applying or abstracting heat from a continuous heat or cold source and a fluid medium, for the same purposes and functions as those of FIGURE 1 but differ therefrom in that the reciprocating interrupter is replaced by a rotary or oscillating insulating shield.

In this arrangement, the numeral 50 designates a portion of a conduit which contains a fluid medium. A plurality of direct or indirect heat exchange devices 52 such as shown in U.S. Patent 1,925,032 are disposed upon the side of the conduit 50 and have heat conducting surfaces disposed upon the interior of this conduit, and preferably flush with the inside circumference of the same. Alternatively, a single annular heat exchanger casing may surround the conduit 50.

Rotatably received within the conduit 50 and mounted upon suitable annular tracks 54 therein, is a heat insulating sleeve 56 having a pair of cutaway portions 58 These cutaway portions are of such size, as shown in FIGURE 2, that when they are in registration with the heat exchangers 52, the latter are placed in heat conductive relation with the interior of the conduit 50 and its fluid medium. In order to impart either rotation or oscillation to the heat insulating sleeve, the latter may be provided with a ring gear 60 upon its external surface, as shown in FIGURE 3. A portion of the conduit 50 is cut away as at 62 and is provided with an enclosing casing 64. Journalled in this casing is a driving gear 66 which is in mesh with the ring gear 60 through the opening 62. The gear 66 may be driven in any suitable manner, and when either oscillated or rotated will impart corresponding pivoting or rotary motion to the insulating sleeve 56. The actuation of the interrupter will be so timed as to apply the heat energy to or from the medium upon only the timed phase angle of the energy wave therein, as desired, and as set forth hereinbefore It will now be appreciated that such rotation or oscillation will intermittently place the heat exchange means 52 in periodic communication with the interior of the conduit 50 and thus impart heat energy into or subtract heat energy from the wave transmitting medium within the conduit. Means may also be provided for adjustably varying the arcuate or circumferential extent of the heat insulating shield or interrupter 56 and thereby to vary the area of heat exchanger and the duration of its exposure to the fluid medium.

For this purpose the portions of the sleeve between the openings 58 are made with arcuately adjustable sliding sections shown at 55 and 57 and which have a sliding joint 59. Thus, by any suitable means, not shown, sections 55 and 57 may be arcuately lengthened or shortened to thereby correspondingly vary the width or circumferential extent of the openings 58.

This embodiment can be employed as a propulsive or pumping means for fluids in the same manner set forth in connection with the embodiment of FIGURE 1.

The operation of this form of the invention is identical with that set forth in connection with FIGURE 1 except that an arcuate or rotary insulating sleeve is provided in place of the axially reciprocating sleeve of FIGURE 1.

FIGURES 4–9

Indicated at 100 is a pipe or conduit of any suitable character and in open communication with this pipe is a cylindrical casing 102 which may constitute an enlargement of the pipe. Disposed within the casing 102 is a cylindrical housing, casing or sleeve 104 in which is disposed a source of heat or refrigeration of any desired type and in particular of any of the types set forth herein, or in any of my co-pending application and in my Patents 3,042,115 and 3,133,591 the casing 104 thus constituting a heat exchanger.

A rotary or oscillatory interrupter 106 in the form of a sleeve is disposed between the circular housing 104 and the cylindrical casing 102 for rotation or oscillation therebetween.

The member 106 is of a suitable heat insulating refractory material, being caused to rotate by any desired mechanism, not shown, but may be as shown in FIGURE 3, and which in itself forms no part of the present invention. The arrangement is such that upon rotation or oscillation of the interrupter, the source of heat or refrigeration will be intermittently placed in communication with the fluid medium in the pipe 100.

Thus, periodic applications or impulses of heat may be transmitted from or to the heat exchanger device 104 and the fluid within the conduit 100 for the purpose of causing pulsating heat to or from the same; for initiating and/or maintaining, modifying or augmenting the energy content of an energy-carrying wave. Although in some instances the same may be omitted, it is preferred to provide a means for introducing and in properly timed relation, a relatively cooler or hotter medium into the fluid pressure medium in contact with the heat exchanger device and the interrupter, the same consisting of a passage 108 extending vertically through the wall of the interrupter 106.

As shown in the detail view of FIGURE 5, this passage is provided with a plurality of discharge ports 110 whereby a heat means or coolant, whether gaseous or liquid, may be discharged from the surface of the interrupter into the fluid medium adjacent that surface, for a purpose to be subsequently set forth.

The interrupter is provided with a pair of preferably sharply beveled edges 112 and 114 which respectively constitute the opening and closing edges of the interrupter, the latter being assumed to be rotated in a clockwise direction, as shown by the arrows and as viewed in FIGURES 4, 6–9.

If desired, the interrupter sleeve may be provided with a means 107 whereby the circumferential extent of the sleeve may be variably adjusted. This means may be of the construction and operation set forth in connection with the elements 55, 57 and 59 of FIGURES 2 and 3.

Figure 4:
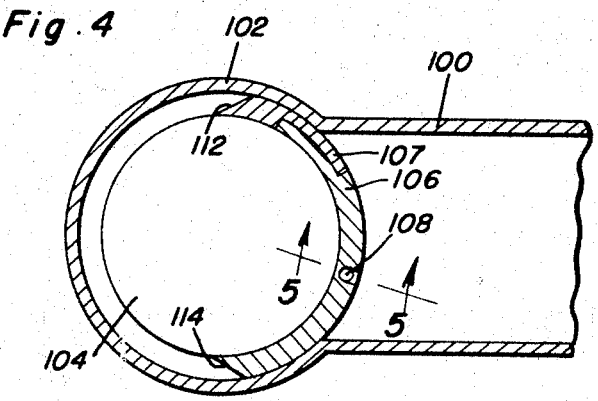
FIGURE 4 is another modification and is a horizontal sectional view of an embodiment employing a source continuously emitting and/or abstracting heat at a substanially uniform intensity and producing therefrom pulating applications of heat energy as into a fluid medium or producing and/or maintaing an energy bearing wave herein.

For an understanding of the operation of this embodiment of the invention, attention is directed to the diagrammatic views of FIGURES 6–9 which show sequential steps in the operation, if rotary, when taken in conjunction with FIGURE 4. These FIGURES 6–9 show for illustrative purposes, the introduction of heat into a medium, the abstraction of heat being similar, but in reverse.

It is assumed that the device is in the position shown in FIGURE 4. At this time the source of heat 104 is cut off by the interrupter 106 from the fluid medium in the pipe 100 and the latter is thereby in its relatively cooled state. At this time a coolant is being supplied through the conduit 108 and ports 110 to further decrease the temperature of the fluid medium adjacent the interrupter.

Figure 6:
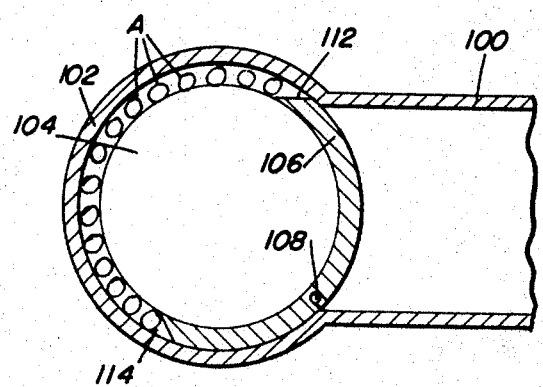
FIGURES 6–9 are diagrammatic views similar to FIGURE 4 but showing sequential steps in the method and in the operation of the apparatus of FIGURE 4.

In the next rotational position shown in FIGURE 6, the flow of coolant is about to cease, since the discharge ports from the passage 108 for the same are passing into the arcuate portion of the casing 102 and thus will be closed. The opening or trailing edge 112 of the interrupter 106 has not yet cleared the end of the casing 102, and at this time it may be assumed that the layer of fluid in the pipe 100 adjacent the interrupter is at its lowest temperature. It will be noted that the space within the casing 102, between the edges 112 and 114 of the interrupter 106 and outside of the heating device 104 and which has been previously filled with fluid from the conduit 100, as will be apparent hereinafter, is at its maximum temperature and pressure because of the action of the heat emitted by the heating device 104. Consequently the fluid in that space has been largely converted to a heat pressure fluid, this fluid being of the substantially maximum pressure and temperature, and being indicated by the letter A, which designates the pressured and heated particles of the fluid.

Figure 7:
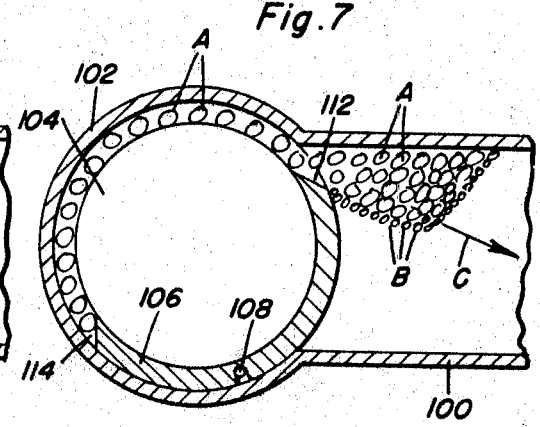

Upon still further movement of the interrupter from the position of FIGURE 6 to that of FIGURE 7, it will be apparent that the action of the cooling passage 108 has been completely cut off; and the edge 112 of the interrupter has now cleared the casing 102 and opened communication from the annular space between the heater 104 and the casing 102 to the interior of the conduit 100. Consequently, the fluid within this annular space and which is at its greatest temperature and pressure, is free to expand into the pipe 100, and does expand therein, the highly heated and expanded and heat supercharged particles of fluid A discharging into the pipe. As this heated and expanded fluid meets the outer layer of the fluid within the pipe, it heats the fluid and generates therein further, expanded fluid, as indicated at B. An outer layer of expanded fluid B is thereby formed upon the boundary of the mass of highly heated and expanded fluid discharge from the heating device. The direction of flow of the heated and expanded fluid is indicated by the arrow C, this direction and the shape of the flow being determined by the relative shape of the edge 112 and its relation with respect to the wall of the pipe. The heater 104 is beginning to be directly exposed to the fluid in the pipe 100 for directly heating the same. At the same time, the continuing rotation of the interrupter 106 is causing its edge 112 to begin to scavenge or clear the annular space between the heater 104 and the casing 102, thereby assisting in discharging the highly heated and expanded contents of this annular space.

Figure 8:
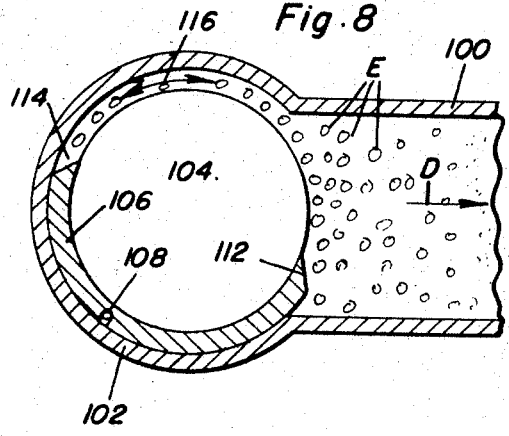

As the device moves into the next position shown in FIGURE 8, it will be apparent that the contents of the annular space are continuing to be discharged; and there is a continuing exposure of the heat source to the fluids of the conduit 100, this fluid being thereby heated and also being driven outwardly along with the heated and expanded fluid designated by A, as indicated by the double-headed arrow 116. Still further, an increasingly greater area of the face of the heating device 104 is being directly exposed to the fluid within the pipe 100 for heating the same. In this position the flow of heat and of the heated molecules of the medium in the pipe 100 adjacent the heater are substantially in the direction of the arrow D. It will be seen that in this view substantially all of the heated and expanded fluid A denoting the superheated condition of the fluid which was entrapped in the annular space being discharged into the fluid within the pipe 100; and that heated fluid indicated at E is now present, this being the heated fluid generated by contact of the medium with the face of the heating device but wherein the medium is free to expand and flow from the device.

Figure 9:
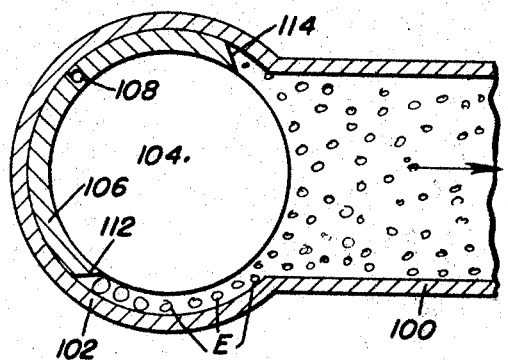

Referring now to the final position of FIGURE 9, it will be seen that all of the face of the heater 104 in direct alignment with the pipe 100 is exposed to the fluid therein for directly heating this fluid. At the same time, the edge 112 of the interrupter has moved into the casing 102, producing an increasingly large annular space into which the fluid medium is free to penetrate. It will now be seen that as the rotation of the interrupter continues, until the edge 114 reaches and closes this portion of the annular space, the latter will be increasingly filled with the medium in the pipe 100, until this medium is trapped in advance of the position shown in FIGURE 4. As soon as the edge 114 has closed the inlet to the annular space, the entrapped medium therein begins to absorb and continues to receive heat from the heating device until the same is in the superheated and pressured condition indicated at A of FIGURE 6.

In order to accentuate the temperature range between the highly heated condition at the opening of the discharge from the annular space, the coolant is introduced into the medium in the conduit 100 by means of the passage 108 and ports 110 as soon as these ports pass into communication with the interior of the pipe 100. This position of the coolant inlet is at about 90 degrees in advance of the position of the coolant port as shown in FIGURE 4. Thus, during the period when the flow of heat from the heating device directly into the pipe 100 is at its minimum, and until just before the edge 112 permits the maximum inflow of heat into the pipe by means of the highly heated particles A, the fluid in the pipe 100 is cooled by the coolant applied thereto.

By this device therefore there is produced a periodic sequence of intense heat impulses followed by periods of cooling. Thus, there is produced a periodic compression wave of a frequency corresponding to the speed of rotation or oscillation of the interrupter 106 and whose limits of compression and rarefaction are increased by the supercharging action of the superheated particles A and by the action of the coolant respectively.

Although the embodiment of FIGURES 4–9 has been depicted in connection with a pipe, it is also evident that the heat exchanger could be positioned in a well bore in direct close heat exchange relation with a formation for treating the same; or could be used in any other desired environment. In addition, it is possible to employ a plurality of pipes 100 each communicating with the casing 102 at circumferential intervals to deliver a plurality of heat impulses in different directions during one rotation of the interrupter.

This embodiment of FIGURE 4 can be used in the same manner as the preceding embodiments as a propellant of fluids in a conduit and particularly could be used to pump fluids from a well bore. If fluid was desired to be circulated down a well bore in one conduit and up another, as for use as a heat pump in obtaining heat from the earth, then the refrigerating means should obtain the best results.

FIGURE 10

Figure 11:
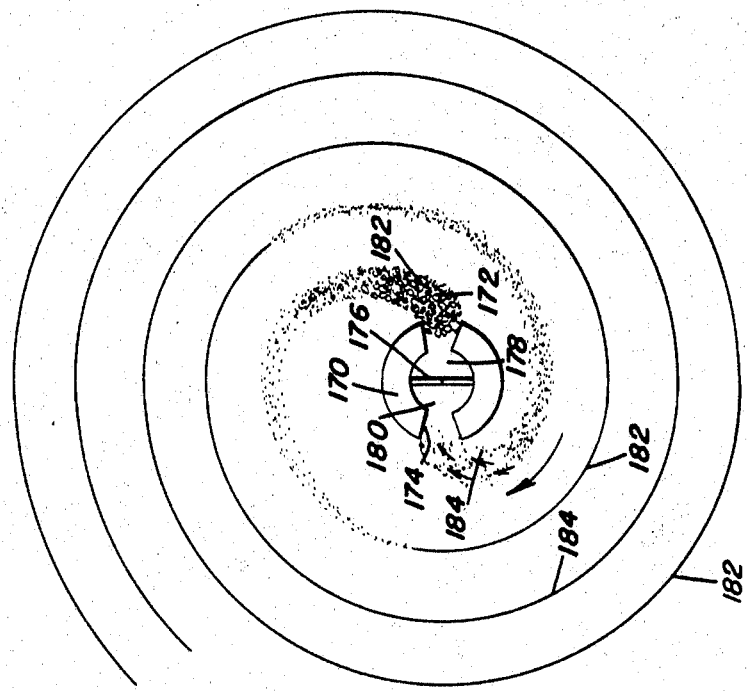
FIGURE 11 is a diagrammatic view of a modification of the embodiment of FIGURE 10 and wherein heat and refrigeration are simultaneously and continuously applied in a spiral or oscillating path in a wave propagating medium.
Figure 10:
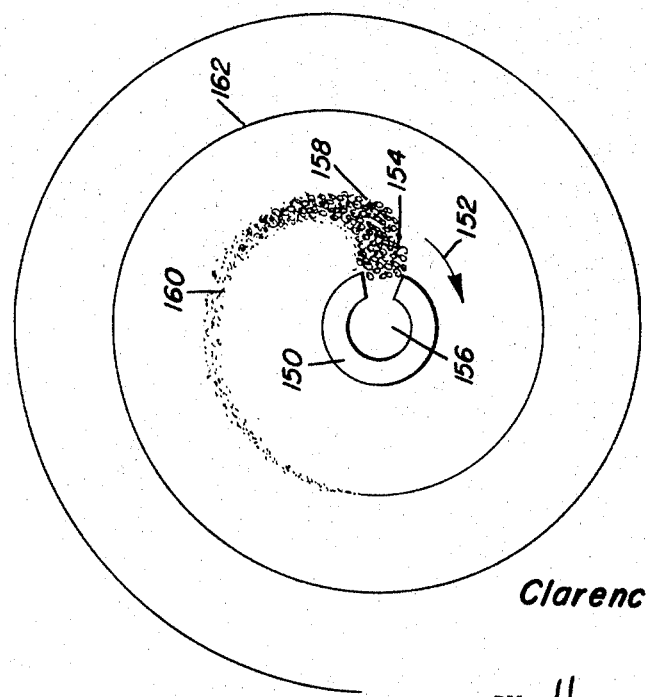
FIGURE 10 is a somewhat diagrammatic view of still another form and method in accordance with this invention, and specifically discloses an arrangement whereby heat is emitted or abstracted in a spiral or oscillatory path from a constant heat source.

FIGURES 10 and 11 disclose diagrammatically still further apparatuses and processes in accordance with this invention for generating a high frequency wave and of applying heat and/or cooling impulses in a spiraling or oscillating manner into an oil and gas containing formation or other region closely surrounding the heating device. The spiralling method is also performed by the apparatus of FIGURES 15–21 referred to hereinafter.

Reference is made first to FIGURE 10 wherein there is shown a cylindrical casing of a heating device at 150, this casing being adapted to be mounted and to be retained in any desired manner in a direction indicated by the arrow 152, if used in the spiralling manner and is provided with an opening 154 upon one side whereby the heat exchange 156 of any desired character is exposed to the surrounding medium through this opening in the outer casing 150 and rotated or oscillated by some means, which could be that shown as to FIGURE 3. The latter is of any suitable refractory construction and constitutes a heat insulating shield or interrupter.

The operation of this form of the invention is as follows: The medium which communicates with the heating device 156 through the opening 154 is highly heated, causing the fluid of the adjacent layer of the medium to be expanded into a pressure means, this condition being indicated by the bubbles expanded fluid at 158, if the apparatus is used in a spiralling manner. As this layer expands, it exerts a compression force which pushes the liquid away from the heater and the interrupter sleeve in a substantially radial direction.

As the adjacent layer in turn is heated, this, too, expands and continues the pushing action. Thus a stream of highly heated and expanded medium particles are impelled away from the heater. If the interrupter rotates in the direction of the arrow 152, it is obvious that it will trail a mass of these highly heated and expanded particles behind the same, in the form of a spiral into the closely associated oil and gas formation or other medium, as indicated at 160. Although the initial outward impulse at any particular location has passed once the aperture or exposure 154 moves on, the previously created stream of outwardly flowing highly heated and expanded particles continues to move outwardly under its own momentum so that when the aperture 154 or exposure returns to its original position, as shown in FIGURE 10, there will be not a circle but a spiral of such particles as indicated by the successive convolutions of the spiral curve 162.

After a plurality of such revolutions, it will be seen that the spiral will have many convolutions, and that each convolution will consist of a mass of heated and expanded particles. There will be thus a continuous spiral train of such expanded particles from the aperture or exposure 154 outwardly into the medium until these particles have lost or dissipated their energy. It will be observed that these expanded and heated particles constitute the compression phase of an energy compression wave, the direction of the wave travel being outwardly along a radius from the center of rotation of the heating device; and the wave length being the distance between successive convolutions or crests formed by the expanded particles. The rarefactions or troughs of the wave will of course lie between these successive crests or between the convolutions of the spiral.

It is thought that the shock of the heated or superheated particles engaging the relatively cooler waves of the medium will produce high frequency shock waves in that medium which will travel throughout the medium.

A very important feature of this embodiment is that it will, if employed solely as a heater, provide an even and uniform distribution of heat throughout a medium, even though heat at a very intense temperature may be emitted from a relatively narrow source.

As described hereinbefore, the heat exchanger 156 is considered to be a heating device, which could be as indicated by 330 of FIGURE 16. It is, however, possible to utilize a cooling or refrigerating device which could be as shown by 370 of FIGURE 16 as the heat exchanger 156, to withdraw heat from the medium and the formation in a similar manner to that set forth in connection with the introduction of heat. If the interrupter is rotated there will be left a spiral trail or path of chilled or contracted molecules in the medium, thus inducing a reverse or inward flow of heat into the heat exchanger by means of the spiral disposition of the refrigerated portions of the medium.

In this use, the spiral curve 160, 162 will represent the rarefaction phases of the energy waves produced, rather than the compression phases. In the first described use of FIGURE 10, the compression phase is increased above the normal in applying energy into the wave, which in the last mentioned use, the rarefaction phase is depressed below the normal.

This last mentioned use of the embodiment of FIGURE 10 is believed to be especially meritorious where it may be desired to introduce a vaporizable liquid such as propane or butane or even liquefied carbon dioxide into a closely associated oil and gas formation. By applying the liquefied gas periodically continuously at the time the refrigerating means is in communication with a portion of a formation, the liquefied gas will be forced into the formation, subjected to the refrigerating effect, before the formation heat will tend to expand and pressurize it. This arrangement therefore effects a great penetration of the formation by the gas in its liquid phase. The embodiment of FIGURE 10 and of FIGURE 11 also would facilitate the distribution of the vaporizable liquid into the formation by the rotary or oscillatory distributing action and by the pulsating action upon the formation by the periodically interrupted application of the refrigerating heat exchanger to a particular portion of the closely associated medium or oil and gas formation.

FIGURE 11

In the embodiment of FIGURE 11 there is disclosed a cylindrical rotatably or oscillatory mounted interrupter sleeve 170, preferably constructed of a highly refractory, heat insulating material, operated by some means, which could be that as shown in FIGURE 3. This interrupter is similar to the member 150 of FIGURE 10, except that it has a pair of oppositely disposed openings, slots or exposures 172 and 174 and upon its interior is divided by a partition 176, likewise of a refractory heat insulating material into two semi-cylindrical chambers. These have therein a heat emitting means 178, which could be a means as shown by 330 of FIGURE 16, for emitting heat through the opening or exposure 172; and a refrigerator or heat absorbing means 180, which could be the means as shown by 370 of FIGURE 16, adapted to absorb heat through the opening or exposure 174.

The heat exchangers 178 and 180 may be of any desired types including those specifically referred to in this embodiment of FIGURE 10, as of FIGURES 16–21, and in this and in my above mentioned co-pending applications.

This form of the invention combines and simultaneously employs the structure and the alternative processes of FIGURE 10. Upon rotation or oscillation of the interrupter 170, a stream of heat is discharged from the slot or exposure 172 into the medium and the closely associated oil and gas formation in the spiralling path or oscillator 182 of the compression phases of the energy waves, if spiralling as shown in 182. Simultaneously, there is an inflow of heat, from the formation and medium into the heat exchanger 180 through the slot or exposure 174. These rarefaction phases of the energy waves lie upon the path 184, if a spiralling wave is produced.

As will be observed, the energy waves, extending radially from the member 170, if spiralling, have their compression phases generated by the heater 178 and lying upon the spiral 182 while their rarefaction phases are initiated by and lie upon the spiral 184. The two devices 178 and 180 thus respectively increase the amplitudes of the compression and rarefaction phases by increasing the difference or potential therebetween.

It will of course be understood that both of the devices of FIGURES 10 and 11 are especially useful in more uniformly heating and/or cooling a circular area; in producing a pulsating pressure therein; in fracturing or shattering formations; and in directing and applying heat to distant locations with but small energy losses therebetween.

FIGURE 12

Figure 12:
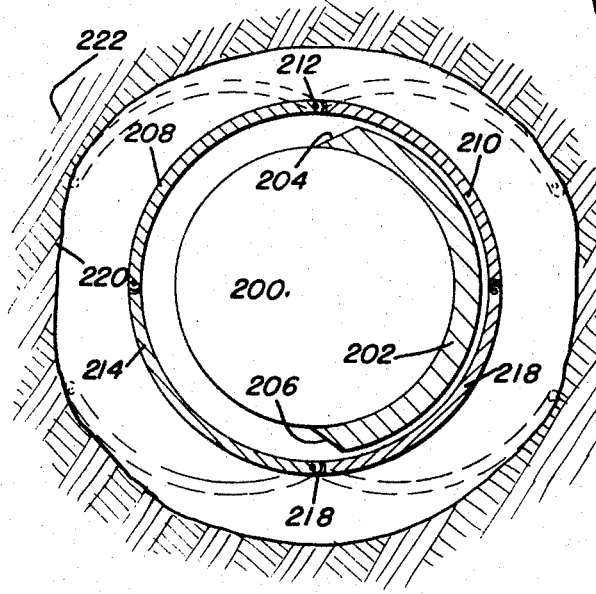
FIGURE 12 is a still further modification and is a horizontal sectional view of an embodiment similar in principle to that of FIGURE 4, but capable of emitting or abstracting heat and producing energy waves in selectively opposite directions.

The embodiment of FIGURE 12 is somewhat similar in principle to that of FIGURE 4. As in that embodiment, there is provided a constant source or sink of heat as indicated by the numeral 200 and which preferably is cylindrical in nature, a cylindrical rotatable or oscillatory interrupter 202, similar to the interrupter 106 of FIGURE 4, being likewise provided and having spaced terminal edges 204 and 206. The space between these edges is thus open and heat energy is constantly emitted or abstracted therefrom while the closed portion between these edges acts as a heat insulating mass to prevent the emission or abstraction of heat in that direction.

A cylindrical casing 208, 210 is provided to surround the heat exchanging device 200 and the rotatable or oscillatory interrupter 202, this casing including cylindrical quadrants disposed in two pairs whereby the same may entirely enclose the heat exchanger as shown in full lines in FIGURE 12 or may be open to permit the emission or abstraction of heat in either of two opposite directions as shown in dotted lines therein. Thus, the pair of quadrants 208 and 210 are pivoted upon a common hinge at 212; while the quadrants 214 and 216 have a common hinge as at 218.

The device is adapted to be disposed within a well bore 220 in a formation 222 and to which heat and/or energy waves are to be transmitted or abstracted. Thus, if the quadrants 208 and 214 are opened, as shown in dotted lines, against the wall of the bore, heat may be emitted or abstracted periodically, during the rotation or oscillation of the interrupter 202, in a direction towards the left. Alternatively, when the quadrants 210 and 216 are open, heat will be emitted or abstracted to the right, periodically, during the rotation oscillation of the interrupter. Still further, all of the quadrants may be opened and heat will be intermittently emitted or abstracted to the right and to the left in alternation.

If a heat source is used, emitted heat may be utilized solely as a pulsating heat applying means for treating a formation; as a means for initiating a pulsating, energy-carrying wave as set forth in connection with previously described embodiments; as a means for augmenting, modifying or maintaining the energy content and characteristics of energy-transmitting waves; or any combination of these.

Figure 5:
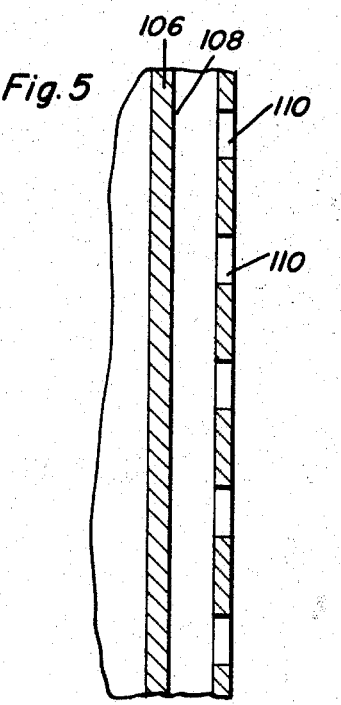
FIGURE 5 is a detail view in vertical section taken upon an enlarged scale substantially upon the plane indicated by the section line 5—5 of FIGURE 4.

As in the embodiment of FIGURES 4 and 5, a heat means or coolant may be introduced into the medium in timed relation to the cold or heat impulses in order to increase the heat differential between the compression and rarefaction phases of the wave. Also as in FIGURE 4, the shield 206 may be of adjustable extent, so as to enable the obtaining of a wave of controllable characteristics.

FIGURES 13 AND 14

Disclosed in FIGURES 13, 14 is a modification of the invention somewhat similar to those disclosed in FIGURES 1–3, in that continuous or periodic sources of heat or cold are intermittently placed in heat exchange relation with the surrounding medium for applying periodic impulses of heat energy into or from that medium in a timed and controlled manner. In order to disclose or exemplify one satisfactory manner in which the heat embodiment of the invention may be utilized, there is illustrated one or more geological formations 250, which may comprise oil bearing formations, which is penetrated by a well 252.

A base 254 is positioned in the bottom of this bore and is securely and fixedly retained therein in any suitable manner, as by means of the slips 256 which engage the walls of the bore for anchoring the base. Rising from this base is an annular bearing member 258 from which extends upwardly a bearing axle 260. Fixedly but rotatably or oscillatably mounted upon the end of the axle 260 and supported by the base 254, is a cylindrical casing 262 which constitutes a heat exchanger and which is heated in any desired manner, it being merely essential for the purposes of this embodiment of the invention that the casing 262 shall be capable of radiating either continuously or intermittently heat at a substantially constant temperature.

A heat insulating interrupter shield for the heating means 262 is provided, the same consisting of a substantially cylindrical sleeve 264 having a base portion 266 which rests upon the bearing member 258 and is rotatably journalled upon the axle 260. The sleeve 264 entirely surrounds and encloses the sides, top and bottom of the heat exchanger casing 262, except for a portion of the cylindrical surface of the heat exchanger which is uncovered by the opening or window 268 of the interrupter.

As so far described, it will be apparent that upon rotation or oscillation of the interrupter, the emission of heat from the heat exchanger 262 will be masked or prevented except from that part of the surface of the exchanger which is uncovered by the opening 268 of the interrupter. Therefore, for a given portion of the formation of fluid medium in contact with the apparatus, there is a periodically interrupted, intermittent or spiral flow of heat from the heat exchanger into the formation or fluid medium, constituting a pulsating input of heat thereto. As set forth in connection with the embodiments of FIGURES 1–3, 10, 11, and 15 to 21, this periodic or spiral application of heat impulses will result in the initiation of an energy-carrying wave in the medium; or will result in an intermittent or spiral heating of the formation or medium; or, alternatively, can be employed as set forth in the preceding and later embodiments of this application, to introduce heat energy into an energy-carrying wave or to otherwise modify the characteristics of an energy-carrying wave.

Also disclosed in FIGURE 13 are a pair of conduits 270 and 272, by means of which electric energy may be supplied to the interior of the heat exchanger 262 in any desired manner, as for example, in accordance with the various electrical heating arrangements disclosed in my co-pending applications; or combustible gases may be introduced for supporting combustion in the heater. In will of course be appreciated that any other source of heat, as, for example, that of an atomic reactor, or the like, may be employed in order to maintain sufficient heat energy in the device 262 to cause the same to emit a substantially continuous flow of heat energy therefrom.

In this form of the invention, it is also contemplated that rotation or oscillation may be imparted to the interrupter 264 in numerous manners as by the use of motors and the like, which could be as shown in FIG- URE 3. As illustrated however, in FIGURE 14, motion is caused by reaction of a fluid supplied under pressure thereto from a remote source. Thus, a conduit 274 extends from any suitable source of fluid under pressure, not shown, into a substantially vertical passage 276 in the wall of the interrupter sleeve. From this passage, a plurality of tangentially arranged discharge nozzles 278 and 280 are provided, which are connected by suitable circumferentially extending passages 282, the latter terminating in discharge nozzles 284. By this means, the fluid under pressure, when discharged from the interrupter shell, will serve to impart rotation to the latter. This fluid may constitute all or a portion of a fluid pressure drive which may be applied to a closely associated oil bearing formation with which the device may be used; or may constitute gases such as LPG carbon dioxide which may be introduced into the pressure drive fluid and/or into the closely associated oil bearing formation for treating the same.

In any event, it will be observed that the fluid under pressure which is introduced into the closely associated formation and/or the pressurizing medium of the same is also utilized to cause rotation of the interrupter and thereby produce pulsations in the application of heat to the formation or the fluid medium contacting the same.

This form of device for imparting heat energy either with a wave for varying the energy content thereof as described hereinbefore or for merely heating a medium, which may also be used as a heat sink for cooling the medium, will produce a spiralling or oscillating flow of heat into the medium in the manner described in detail in reference to the embodiment of FIGURE 10. For a detailed description of this function, attention is directed to the description of the arrangement of FIGURES 10 and 11 referred to hereinbefore.

EMBODIMENT OF FIGURES 15–21

The most preferred form of process and apparatus of this invention is disclosed in FIGURES 15–21. As will be apparent the apparatus will perform simultaneously a number of the functions and methods of various of the previously described and disclosed sub-assemblies as set forth in FIGURES 1–14, these embodiments being also capable of separate and independent utility from that of the rest of the apparatus.

Indicated at 300 in FIGURES 15 and 20 is a portion of a formation which may be an oil bearing or similar formation and to which the principles of this invention are particularly applicable. A bore 302, which may constitute a well bore, is utilized to obtain access to the interior of the formation and to a face thereof. The apparatus forming the subject of this form of the invention is indicated generally by the numeral 304, FIGURE 17, and as shown is positioned within the well bore in proximity to any particular portion of the formation which it is desired to treat thereby.

This embodiment of the invention performs a variety of important operations. First, it operates to apply a fluid medium under pressure to a face of the formation for producing a fluid pressure drive thereon thereby facilitating the secondary recovery of petroleum therefrom; or for other purposes. Second, it further operates as a means for applying pulsating pressures directly to the fluid pressure medium and/or the formation to facilitate the recovery of petroleum therefrom and for other purposes. Third, it is further applicable as a propulsive means for inducing a fluid flow into and withdrawing fluid, heat and/or energy from the medium or formation during the operation of treating the latter. Fourth, it is adapted to apply a flame as sensible heat to the face of a formation. Fifth, it also is adapted to apply combustion products or other gaseous agents into the fluid medium and/or the formation for treating the latter or to function as a vapor lift in the well bore. Sixth, it still further constitutes a means to produce and/or control the energy content of an energy-transmitting wave in the fluid medium to thereby attain various predetermined characteristics and effects of such a wave so as to enable fracturing, disintegrating and other beneficial treatment of a well bore, either horizontally and/or vertically.

As shown best in FIGURES 16, 17 and 20, the apparatus 304 may conveniently be constructed to a generally cylindrical drum-like shape, being adapted to rotate about its vertical central axis. Disposed axially of the cylindrical body are four concentric tubular members, comprising an inner tube 306, a second or surrounding tube 308, a third surrounding tube 310, and an outer tube or sleeve 312. Any one or all of these tubes may constitute the means for supporting and imparting rotation and/or oscillatory movement to assist in the rotation or oscillation of the apparatus; or the rotation or oscillation may be imparted solely by other means as described hereinafter.

Extending diametrically from opposite sides of the outer tube or sleeve 312 or at any suitable angular disposition relative to each other are the two wings or ribs of a heat insulating plate 314. This plate is of the necessary strength and thickness to perform the various functions which will be subsequently set forth hereinafter, and is of a highly refractory and highly efficient heat insulating material of any desired and known character.

Where the adjacent edges of the plate engage the sleeve 312, it is preferred to coat the entire circumference to the sleeve with a similar insulating material, whereby the flow of heat within the cylindrical body from one side of the plate to the other is substantially prevented, or at least as completely as possible. Surrounding and circumscribing the plate 314 and secured thereto and supported thereon are the two semi-circular components arcuate segments 316 and 318 of the cylindrical body. Preferably one segment, as the segment 316, is of a greater area and radius than the other segment 318, as will be more readily apparent from FIGURE 16. The purpose of this difference in the cross-sectional area of the two segments of the cylindrical body is important and will be set forth hereinafter.

An S-shaped hollow rib 320 is integrally or rigidly attached to the outermost sleeve 312 and extends outwardly therefrom, this rib having a chamber 322 therein which communicates with the interior of the sleve 312 through a slot in the latter where the rib joins the sleeve. At its outer end, the rib 320 terminates in a vertically disposed slot or discharge port 324. The latter extends through a corresponding opening in the wall of the segment 316 whereby a fluid, such as water or oil, passing radially outwardly through the rib from the sleeve 312 will be discharged tangentially of the circumference of the cylindrical body, as shown by the arrows 326 in FIGURES 16 and 17. This discharge of fluid will cause a reaction thrust and thereby will produce rotation or assist in producing rotation of the body.

As will be also more readily apparent from FIGURE 18, the rib is provided with an S-shaped opening upon its bottom wall, this slot or opening being shown by the numeral 328. This slot is widest where it merges with the opening 324 in the circumferential wall of the cylindrical segment 316, and progressively decreases in width as it approaches its junction with the outermost sleeve 312.

As so far described, it will now be seen that a fluid under pressure passing downwardly between the tubes 310 and 312 will enter the chamber 322 within the rib 320 and will be discharged both downwardly from the botom slot 328 and also outwardly from the vertical side slot 324.

In some forms and uses of this embodiment of the invention, it may be desirable to close or to temporarily mask either or both of the vertical and horizontal outlet ports 324 or 328 in any suitable manner thereby dispensing with their respective functions. The flow of fluid from the vertical slot 324 serves to produce a rotative thrust upon the body; while the flow from both vertical and horizontal slots serves to apply to the formation and the interposed medium fluid pressure; pressure pulsations; heat and various types of periodic energy transmitting vibratory waves in the medium.

In order to provide free communication between the opposite sides of the rib 320 in the semi-cylindrical chamber, indicated generally by the numeral 330, which chamber lies between the segment 316 and the insulating partition or plate 314, there are provided a plurality of apertures 332, see FIGURE 17, disposed throughout the length and height of the rib. Preferably, although not necessarily, the upper surface of the rib 320 constituting a closure or top wall for the chamber 322 within the rib, lies below the cylindrical body's top wall 334, the latter constituting a closure for the two chambers 330 and 336 which lie upon opposite sides of the insulating plate 314. The top surface of the rib 320 is indicated in FIGURE 20 at 338.

Lying at any convenient location within the chamber 330, as for example, against and partially surrounded by and in good heat exchange relation to the outermost curved portion of the rib 320, is a vertical tubular member 340 providing a chamber 342 therein. A curving rib 344 is provided, the side walls of this hollow rib merging into and being attached to the opposite sides of the tubular member 340, the hollow rib side walls then converging outwardly and terminating in a vertical slot 346 which extends through the circumference of the cylindrical segment 316 to provide a nozzle which is closely adjacent to the nozzle 324 of the previously mentioned hollow rib 320, and which is so positioned as to discharge fluid and/or flame therefrom in the direction indicated by the arrow 348, this being in the same tangential direction of discharge as that of the nozzle 324. This fluid discharge can be the assisting or sole rotational means of the apparatus.

At its upper end, the tubular member 340 is substantially at the same level as that of the rib 320, and as shown in FIGURE 20 is provided with a downwardly opening non-return valve assembly 350 of any desired character. The latter will permit fluid and/or flame to pass from the interior of the chamber 330 downwardly through the check valve assembly 350 and through the chamber 342 within the member 340; and from thence, at the bottom of the member 340, be discharged through an opening 352 in a side wall of the same into the above-mentioned hollow rib 344 for peripheral discharge through the slot or nozzle 346 as indicated by the arrow 348.

As also shown in FIGURE 18 the lower end of the tubular member 340 has a bottom wall 343 which is positioned above the bottom wall of the cylindrical member as shown in FIGURE 20. A channel or passage 354 extends across the botom wall of the body and communicates with the lower portion of the vertical slot 346. This channel or passage is of a triangular shape with the discharge slit at the apex thereof. This channel is in communication with the chamber 342. Thus, a fluid medium or flame within the chamber 330 can pass the check valve assembly 350 and will then be discharged either tangentially outwardly from the circumference of the segment 316 through the nozzle or slot 346; or through the opening 354 in the bottom wall of the cylindrical member. In either event, the flame may be directly applied to the face of the formation or into the interposed medium.

At this point it should be observed that the check valve assembly 350 may be of any desired construction. It may constitute a simple spring-closed check valve; or may be of such character that its closing pressure shall be susceptible of manual control and adjustment in any conventional manner.

Within the chamber 336 upon the opposite side of the partition 314 from the previously described chamber 330, there is provided a second hollow rib 356, which at its outer end is considerably laterally enlarged, and which is provided with an intake opening 358 through the circumferential wall of the segment 318. This opening 358 constitutes an inwardly directed nozzle and preferably is in the form of a vertical slot as will be readily apparent from FIGURE 19. The fluid medium surrounding the cylindrical body, and/or fluids flowing from the formation are inducted by the nozzle 358 into the hollow rib and as they pass through the latter into the outlet tube 310, the reaction may impart a rotating thrust to the rib 356. The enlarged portion within the nozzle 358 constitutes an expansion chamber whereby the expanding incoming fluids may impart a cooling action to the apparatus.

Preferably the top wall of the rib 356 joins the top wall or cover 334. It is preferred to also provide a plurality of openings or passages through the rib, similar to the passages 332 of the rib 320, whereby communication is established in the chamber 336 upon the opposite sides of the rib. For convenience and simplicity of illustration, these apertures in the rib 356 have, however, been omitted from the drawings.

The chamber 360 within the hollow rib 356 extends throughout its entire vertical height of the same and opens through the bottom wall of the cylindrical body in the form of an S-shaped slot 362 which also, as in the case of the slot 328 of the rib 320 is widest at its outermost portion, and converges or narrows towards its inner end. The inner end of the hollow rig 356 is rigidly attached to the next to the outermost tube or sleeve 310 as shown in FIGURE 16 and communicates with the interior thereof, the walls of the rib passing through the wall of the sleeve 312 upon the opposite side from the junction of the rib 320 with the outer sleeve 312. This slot 362 functions as a supplement or a substitute for the vertical slot 358, and may with that slot, be masked or covered in the same manner as described in connection with the slots 324 and 328.

The inlet opening passage 358 is curved in the same general direction as the nozzles 324 and 346, whereby fluid may flow tangentially into the slot as indicated by the arrows 364, in order to aid in the rotation of the member 304 or comprise the sole means for this purpose. From the interior of the rib 356, the fluid may then flow upwardly through the interior of the tube 310 between the tubes 310 and 308. It should be observed that by suitable fluid control valves associated with each of the tubes 310 and 312 not shown, and which may be located at the surface of the well bore, the flow of fluid into or out of the apparatus and well bore may be selectively stopped to render that portion of the apparatus inoperative; or may be intermittently operated to produce pressure pulsations and/or energy waves in the fluid; and/or to produce hammer or shock waves therein for treating the formation. Further heat and/or wave energy may be imparted to the fluids of either conduit 310 or 312 as desired.

The tubes 306 and 308 constitute means whereby gas and air, respectively, may be introduced into the device, and specifically into the heating chamber 330 for combustion therein. At a convenient position above its lower end, the air supply tube 308 communicates with a pipe 366 which extends through the encircling tubes 310 and 312 and into the chamber 336. The pipe 366 is provided with a restricted portion 368 whereby the air, which may for this purpose be supplied under an extremely high pressure, may be expanded when passing this restriction, and in its expansion will become preheated by the absorption of heat from its surroundings, the expanding air thus passing through a series of heat exchange or refrigerating coils 370 which are disposed in the chamber 336 closely adjacent the wall of the segment 318, and which may conveniently extend from the top to the bottom of that chamber. From the other end of the refrigerating coil, the air conducting pipe is provided with a substantially horizontally extending section 372, which as shown clearly in FIGURE 16 passes through the insulating partition 314 and into the chamber 330, terminating in an outwardly flaring discharge and mixing nozzle 374. The combustible gas supplied through the tube 306 is led from a pipe 376 connected with the bottom of the same, this pipe also passing through the three outer concentric tubes or sleeves, and terminating in a discharge nozzle 378 appropriately disposed within the air discharge and mixing nozzle 374. Thus, gas and air are mixed and discharged into the chamber 330 in proper proportions for maintaining combustion therein. Ignition of the combustible gases may be effected and maintained in any desired manner, and since such arrangements are conventional and well known, illustration or description of the same appears to be unnecessary.

As previously mentioned therein, the cylindrical body is eccentrically disposed for rotation, with the segment 316 comprising a greater cross-sectional area than the segment 318, as more clearly shown in FIGURE 16. The purpose of this arrangement is to cause the cylindrical body to function as an eccentric rotor type of pump. As will be evident from an inspection of FIGURE 16, the rotation of the body about the vertical axis of the concentric tubes, will cause the mid-portion of the segment 316 to rotate in the well bore 302 in a closer relation to the wall of the bore than will be the mid-portion of the segment 318. Thus, there will be a pumping action imparted to the fluid within the well bore during this rotation, which will result in pressure impulses being applied to the fluid medium in directions radially outwardly from the center of rotation of the body.

The device will therefore produce mechanically, pressure pulsations in the fluid medium which, under certain conditions, will be sufficient to set up high frequency energy transmitting waves in the medium. These pulsations and/or energy waves when applied to the formation will facilitate the secondary recovery of oil therefrom; and/or will assist in fracturing or rupturing the formation, thereby further promoting the recovery of oil.

Still further, this rotation and the pressure pulsations set up thereby will produce a pumping action in the well bore which will tend to assist and/or cause fluids to be pumped from the medium and the formation out of the well bore through the device as previously mentioned. The device itself may further function in conduits, tanks or other environments as a source for applying propulsive forces to fluids for causing flow of the same.

As further suggested in FIGURES 15, 19 and 20, the bottom surface of the cylindrical body is provided with two relatively inclined portions forming a dihedral angle with each other. Thus, there is provided a substantially flat portion 380 which joins with a substantially inclined portion 382. Upon rotation of the body, the inclined portion 382 will impart a downward impulse or thrust to the fluid beneath the same and the frequency of this pulsation will be dependent upon the speed of rotation. The pulsations produced by the relatively inclined portions of the bottom surface of the cylindrical rotary body will be primarily directed to the bottom of the bore but will also contribute towards the performance of the functions set forth in connection with the eccentricity of the cylindrical body.

OPERATIONS OF THE EMBODIMENT OF FIGURES 15–21

The apparatus as disclosed in the embodiment of FIGURES 15–21 can be operated upon a member of different methods and to perform a variety of functions and/or groups of functions. Broadly, these may be loosely segregated into three groups, as follows:

(I) Applying pulsating pressures through a fluid medium into a formation to thereby promote the flow of oil therefrom;

(II) Applying heat to a formation or the fluid medium in contact with a formation to facilitate the recovery of oil therefrom;

(III) Promoting the flow of fluid from a formation and well bore by functioning as a pump and/or vapor lift for the same. These three generic types of operations and methods will now be discussed in detail in the order given above.

(I) *Applying pulsating pressures*

This apparatus is adapted to function as a means for applying pulsating fluid pressures of various types to an oil bearing formation by either the process of directly and mechanically producing such pressure pulsations upon a fluid medium in operative contact with the formation; or by operating upon the process of distributing or transmitting fluid pressure pulsations, elsewhere generated, periodically to a fluid medium for transmission by the same into a formation.

Considering first the function of the rotating body as a mechanical pumping means, it will be evident that the eccentricity of the body will produce in the well bore a pulsating pumping action against the surrounding face of the formation, and in a circularly progressing manner, as the eccentric surface of the same rotates about the axis of the series of concentric tubes. Thus, each time the mid-portion or the outermost portion of the segment 316 passes the formation, a pressure or compression impulse is set up thereby; and each time the mid-portion or innermost portion of the segment 318 passes that portion of the formation a rarefaction impulse is produced. In a similar manner, the bottom surface of the body with its two inclined portions will also produce pressure pulsations. These pulsations alternately increasing and reducing the pressure of the fluid medium upon that adjacent portion of the formation, will assist in fracturing or disrupting the face of the formation by the joint action of the fluctuating pressure on one side of the face and the internal, substantially constant formation pressure on the other side of the same. In addition, the pulsating pressures will induce and facilitate a flow of oil from the interstitial spaces of the formation.

Still further, the frequency and the amplitude of the pulsations thus produced in the fluid medium may be such as to generate energy transmitting waves in the medium; or to impart energy to such waves if generated from other sources. The energy waves thus produced will penetrate into the formation extending the zone of the formation being treated by vibratory action from the above mentioned causes and functions, and still further, may be converted into heat in remote portions of the formation, still further facilitating the recovery of oil therefrom.

It should also be understood that the pulsations produced by the mechanical action of the rotating cylindrical body may be imposed upon or may be supplemented by other pressure pulsations and/or energy transmitting high frequency waves which may be imparted to the fluid medium prior to its introduction into the apparatus and through the latter into the well bore; or even, in the column of the fluid medium which is leaving the well bore through the apparatus, as set forth hereinbefore, by producing appropriate frequencies and phase relationships between the various waves.

In addition to its operation during rotation as a mechanical generator of pressure pulsations, the device also may function as a rotary distributor of fluid under pressure, whether the pressure is pulsating or constant, for applying this fluid under pressure to the formation in such a manner as to obtain a pulsating effect thereby. In its functioning as a rotary distributor, the rib 320 and its discharge nozzle 324 discharge fluid under pressure, whether of a continuous or a pulsating pressure, through the fluid in the well bore an dagainst the fact of the formation. As the cylindrical body rotates, this discharged fluid produces a pressure impulse through the fluid medium and against the face of the formation. The location of this impulse varies as the cylindrical body rotates, and therefore, for any given portion of the formation, or the fluid medium in contact therewith, there is an intermittent application of the fluid pressure applied by the nozzle 324 as the device rotates.

The pulsations produced in this manner in the fluid medium and in the formation perform the various functions set forth hereinbefore in the description of the operation of the device. It will also be observed that the discharge orifice 328 on the bottom wall of the cylindrical body will likewise, by the same means as the nozzle 324, produce pressure pulsations which although directed downwardly against the bottom of the well bore will also function in the same manner.

It should be noted that the hollow rib 356 will function in the same manner to produce pressure pulsations. Thus, the operation of the intake nozzle 358 will produce a zone of lowered pressure and since this zone is rotating, the formation will be subjected periodically and sequentially during such rotation to a lowered pressure at a time interval and phase angle difference with respect to the one of higher pressures produced by the nozzle 324. Therefore, the fluid withdrawing means may function alone for withdrawing fluid from the formation or well bore to produce pressure pulsations; or may function in cooperation with the pressure introducing means of the nozzle 324. The intake of fluid through the nozzle opening 362 will supplement and/or comprise a substitute for the action of the nozzle 358.

(II) *Applying heat*

A further important function of this apparatus is to apply heat in various ways and by various processes to a fluid medium in contact with the formation and/or to a formation. It is, of course, possible to introduce such heat by preheating the fluid medium itself in any of the previously described processes of operation, to thus apply sensible heat to the formation; or to release sensible heat into the formation through energy transmitting waves carried by the pulsating pressures as previously set forth.

However, it is further possible to employ in conjunction with the preceding processes, or separately, as desired, other processes for the introduction of heat into the medium or formation. Thus, the introduction of combustible gases through the pipes or tubings 306, 308, and the combustion of the same in the heating chamber 330 will produce heated products of combustion. These products may be directly applied in the form of hot combustion products and/or the flame of burning combustion products either through the vertical slot or nozzle 346 and/or through the slot 354 in the bottom wall of the cylindrical body. By this means, heat energy may be directly applied into the fluid medium for raising the temperature of the same and thus applying heat to a formation. Alternatively, the burning gases and/or the hot products of combustion may be directly applied, as in a dry well bore, to the face of the formation for heating the same. The application of such heat will result in or will greatly facilitate the fracturing or disintegration of the formation; and will heat the same to lower the viscosity of the fluids in the formation and facilitate their flow therefrom. Moreover, heat applied by this agency is periodic in nature, the same being applied to a portion of a formation, which is then allowed to cool by absorbing the heat into its interior, until upon the next rotation of the cylindrical body, heat is again applied. There is thus a pulsating application of heat, resulting in intermittent heating and cooling of the formation which further contributes to fracturing of the same.

It is especially believed that this process may be practiced by providing the bottom wall of the cylindrical body with a drill bit whereby the heating effect from the lower discharge opening 354 in particular will contribute to the penetrating and breaking of the formation by the drill bit.

It is further within the scope of this invention to employ heat of such an intensity and of such a frequency, as determined by the speed of rotation of the cylindrical body, that the intermittent application of the same to the formation will result in the generation therein of an energy transmitting wave, which wave will function in the manner set forth in connection with the preceding processes.

It should also be observed that the location of the cylindrical body 340 and its chamber 342, against the rib 320 which conducts the pressure medium, will serve also to preheat the latter and impart heat to this medium which issues from the nozzle 324.

In addition to the actual input of heat, to serve as a means for producing a pulsation in the medium and/or the formation, it is observed that the refrigerating action of the coil 370 will enhance this effect by accentuating the temperature differences between successive applications of heat to the formation. The expanding of the air supplied under pressure by the tubing 308 by its passage through the reduced portion 368, serves to absorb heat from that portion of the device lying upon the side of the heat insulating partition 314 which is remote from the heating chamber 330, thereby rapidly withdrawing heat from the formation. At the same time, such air is preheated for introduction into the heating chamber.

It is, of course, possible to utilize the operation of the heating from the chamber 330 or the cooling effect of the chamber 336 and its refrigerated coil 370, either separately or together.

It is also within the concept of this invention to use various other sources of heat in the chamber 330, whether of a continuous heat emitting type or of an intermittent type. As an example, the heating means set forth in my co-pending applications Ser. Nos. 431,246, now Patent 3,133,591, and 431,388 now abandoned, are especially deemed satisfactory for use herein.

(III) *Fluid pump and vapor lift*

The apparatus is especially adapted for effecting a process for producing a vapor lift to assist in the flow of fluid mediums from the formation and well bore. For this purpose, gaseous fluids may be introduced into the well bore. These may consist of the gaseous combustion products from the chamber 330 as discharged by the vertical nozzle 346 and/or the horizontal nozzle 354 upon the bottom wall of the body; or of a gas supplied through the tubing 312 for discharge through the nozzle 324 and/or the bottom nozzle 328. The discharge of these gases which may be of any desired character, will mix with the fluid in the well bore and facilitate the upward flow of the same through the device by means of the inlet nozzles 358 and/or 362, as previously set forth.

It will thus be seen that this apparatus in its entirety and in its more complete process of operation will perform the functions of various of the subcombinations previously described in this application.

During these three types of operations just described, it should be especially noted that the flow of fluids into or out of the device, through any of the various nozzles set forth may be utilized in whole or in part as the rotation producing means for the cylindrical body.

In the operations above referred to, the pulsating pressure impulses produced by any of the three types of operation mentioned when striking a formation will apply pulsating pressures within the outlets of the capillary interstitial openings or pores of the formation. The outermost molecules of oil in these pores will act as liquid pistons, and will reciprocate and vibrate in their capillaries, thereby acting as pistons for transmitting the impulses back into the formation through the train of oil molecules. This action, occurring within the interstitial spaces will greatly facilitate the release and recovery of petroleum from a formation, as described in detail in my co-pending application Ser. No. 241,647, now Patent 2,796,129.

In the application of heat directly to the formation by flame or hot gases, the oil molecules within the outer zone of the interstitial spaces will be highly heated, thereby expanding and sending a pressure pulsation back into the formation; and when the flame is removed, the molecules will cool and contract allowing the compressed fluids within the capillaries to send a pressure pulse outwardly. This pulsation will be set up within the formation which will facilitate the recovery of oil.

This invention has been described with reference to specific and preferred embodiments. It will be apparent, however, that many modifications can be made without departing for the spirit of the invention. For example, the term heat source as used herein is meant to be inclusive of a beginning, or origin, or that point where heat springs into being and includes a heat exchange and/or a heat sink where heat in given or received. Accordingly, this invention should be limited only by the scope of the appended claims and not limited by the embodiment described.

What is claimed:

1. The process of controlling the energy content of an energy transmitting wave in a wave propagating medium which comprises:
    placing a continuously emitting heat source into heat exchange relation with a wave propagating medium to establish a predetermined level of heat transfer;
    cyclically interposing a heat flow interrupter between said source and successive portions of said medium to substantially reduce said level of heat transfer at a controllable frequency and during a predetermined phase angle of an energy transmitting wave in the medium such as to thereby produce a pulsating heat flow from the source to the medium.

2. The process of claim 1 wherein the interposing of the interrupter is effected by reciprocating the interrupter.

3. The process of claim 1 wherein the interposing of the interrupter is effected by pivotally moving the interrupter.

4. The process of claim 1 wherein the interposing of the interrupter is effected by oscillating said interrupter.

5. The process of claim 1 wherein the interposing of the interrupter is effected by rotating said interrupter.

6. The process of claim 1 including the step of introducing a coolant fluid into the medium in timed relation to the application of heat to the medium.

7. The process of claim 1 including the step of introducing a coolant fluid into the medium in timed relation to the application of heat to the medium, the interposing of the interrupter being effected by pivotally moving the interrupter.

8. The process of claim 1 including the step of introducing a fluid into the medium and utilizing the introduction of fluid to effect the intermittent interposing of the interrupter.

9. The process of claim 1 including the step of introducing gas into the medium in timed relation to the application of heat to the medium.

10. The process of claim 1 including the step of introducing gas into the medium in timed relation to the application of heat to the medium.

11. The process of claim 1 including the step of introducing gas into the medium in timed relation to the application of heat to the medium, and introducing a fluid into the medium, and utilizing the introduced fluid to effect the intermittent interposing of the interrupter.

12. The process of applying or controlling heat energy carrying waves to an energy pressure wave transmitting medium which comprises;
    placing a continuously emitting heat source into heat exchange relation with the medium to establish a predetermined level of heat transfer;
    cyclically interposing a heat flow interrupter between the source and successive confined portions of the medium to substantially reduce said level of heat transfer at a controllable frequency so as to increase the heat and energy of said successive portions and thereby produce a pulsating flow of heat energy carrying waves from the source into the medium.

13. The process of claim 12 wherein the interposing of the interrupter is effected by reciprocating the interrupter.

14. The process of claim 12 wherein the interposing of the interrupter is effected by reciprocating the interrupter.

15. The process of claim 12 wherein the interposing of the interrupter is effected by oscillating said interrupter.

16. The process of claim 12 wherein the interposing of the interrupter is effected by rotating said interrupter.

17. The process of claim 12 including rotating the heat source to apply heat to the medium in a circular path.

18. A process according to claim 12 wherein said heat source is a heat exchange source.

19. The process of controlling the energy content of an energy transmitting wave in a wave propagating medium which comprises;
    placing a continuously receiving heat sink into heat exchange relation with a wave propagating medium to establish a predetermined load of heat transfer;
    cyclically interposing a heat flow interrupter between said sink and successive portions of said medium to substantially reduce said level of heat transfer at a controllable frequency and during a predetermined phase angle of an energy transmitting wave in the medium such as to thereby produce a pulsating heat flow to the sink from the medium.

20. The process of applying or controlling heat energy carrying waves from an energy pressure wave transmitting medium which comprises;
    placing a continuously receiving heat sink into heat exchange relation with the medium to establish a predetermined level of heat transfer;
    cyclically interposing a heat flow interrupter between the sink and successive confined portions of the medium to substantially reduce said level of heat transfer at a controllable frequency so as to increase the heat and energy of said successive portions and thereby produce a pulsating flow of heat energy carrying waves into the sink from the medium.

21. The process of claim 12 wherein said heat source is from atomic reaction.

22. The process of claim 12 wherein said energy wave transmitting medium is an oil or gas containing formation.

23. The process of claim 22 wherein the pulsating flow of heat energy carrying waves are used to fracture said formation.

24. The process of claim 12 wherein said interrupter includes means to intermittently apply a coolant fluid to the medium in timed relation to the pulsating flow of heat energy carrying waves applied to the medium thereby increasing the energy content of said pulsating heat energy carrying waves applied to the medium.

25. The process of claim 24 wherein said medium is an oil or gas containing formation.

26. The process of claim 25 wherein the pulsating heat energy carrying waves are used to fracture said formation.

27. The process of claim 21 wherein the pulsating heat energy carrying waves from said atomic reaction are applied to an oil or gas containing formation thereby increasing the production of oil and gas therefrom.

28. The process of claim 27 wherein said application of pulsating heat energy carrying waves from said atomic reaction is used to fracture said formation.

29. The process of claim 12 wherein the energy of the pulsating flow of heat energy carrying waves is used to assist in transporting the medium to which the pulsating heat energy carrying waves are given.

30. The process of claim 29 wherein the medium being transported is the fluid from an oil or gas containing formation.

31. The process of claim 30 wherein gas is intermittently applied to the medium in timed relation to the pulating heat energy carrying waves to assist in transporting aid fluid from said formation.

32. The process of claim 29 wherein the medium is a rive fluid for oil and gas containing formations.

33. The process of claim 32 wherein said drive fluid ontains a gas.

34. The process of claim 24 wherein said coolant fluid ontains a gas.

35. The process of claim 25 wherein said coolant fluid ontains a gas.

36. The process of claim 26 wherein said coolant fluid ontains a gas.

37. The process of claim 20 wherein the energy of the ulsating flow of heat energy carrying waves is used to ssist in the transporting of the medium from which the eat energy carrying waves are obtained.

38. The process of claim 37 wherein the medium is the luid of an oil or gas containing formation.

39. The process of claim 20 wherein said interrupter ncludes means to intermittently apply a heated fluid to he medium in timed relation to the pulsating flow of eat energy carrying waves from the medium thereby ncreasing the energy content of said pulsating heat energy arrying waves from the medium.

40. The process of claim 37 wherein gas is intermittently applied to the medium in timed relation to the pulsating heat energy carrying waves to assist in the transporting of said medium.

41. The process of claim 40 wherein said medium is the fluid of an oil or gas containing formation.

References Cited

UNITED STATES PATENTS

| | | | |
|---|---|---|---|
| 1,117,444 | 11/1914 | Robinson | 165—96 |
| 1,747,011 | 2/1930 | Kerr | 122—459 |
| 1,925,032 | 8/1933 | Dunner | 165—96 |
| 2,136,626 | 11/1938 | Lind | 165—86 |
| 2,549,464 | 4/1951 | Hartley | 290—1 |
| 2,805,048 | 9/1957 | Angelery | 165—81 |
| 2,836,033 | 5/1958 | Marrison | 60—24 |
| 2,839,276 | 6/1958 | Rossi | 165—81 |
| 3,016,893 | 1/1962 | Brown | 165—154 |
| 3,133,591 | 5/1964 | Brandon | 166—39 |

LOUIS J. CAPOZI, *Primary Examiner.*

U.S. Cl. X.R.

165—96; 166—177

UNITED STATES PATENT OFFICE
CERTIFICATE OF CORRECTION

Patent No. 3,438,352                          Dated _____

Clarence W. Brandon

It is certified that error appears in the above-identified patent and that said Letters Patent are hereby corrected as shown below:

In claim 10, column 21, line 58, "1" should be -- 6 --.

In claim 14, column 22, line 7, "reciprocating" should be -- pivotally moving --.

In the listing of the assignees, insert after "Forsyth, Ga.", -- and five percent to Harvey B. Jacobson, of Washington, D. C.

SIGNED AND
SEALED
MAR 24 1970

(SEAL)
Attest:

Edward M. Fletcher, Jr.
Attesting Officer

WILLIAM E. SCHUYLER, JR.
Commissioner of Patents